(Model.)
J. MURRAY.
WOOD PULLEY.
No. 462,363. Patented Nov. 3, 1891.
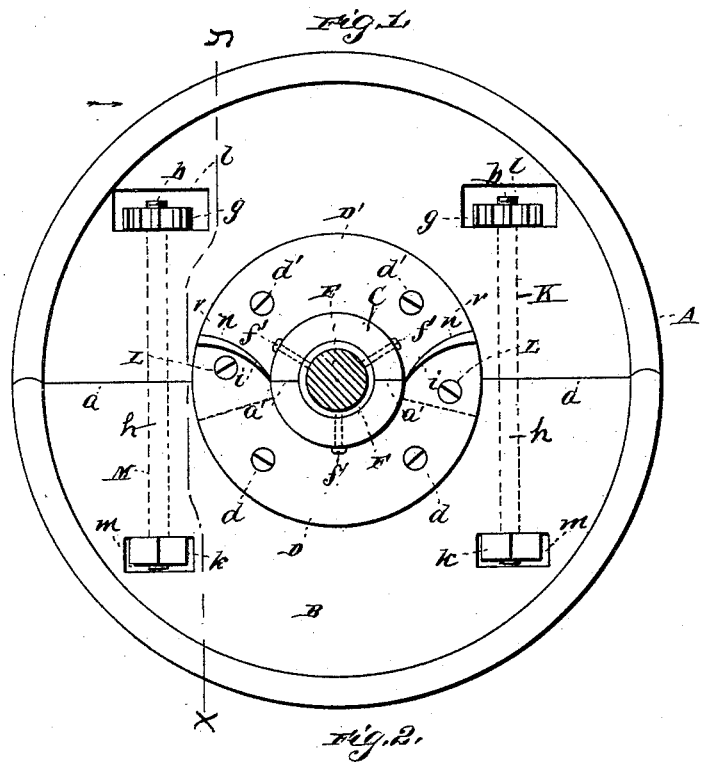
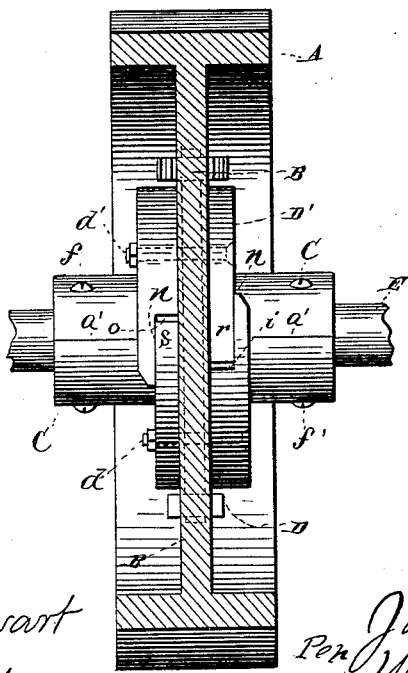
Witnesses:
Uzziah H. Stewart
Josephine Hebert
Inventor:
John Murray
Per Watts P. Denny
Attorney

UNITED STATES PATENT OFFICE.

JOHN MURRAY, OF FORT WAYNE, INDIANA.

WOOD PULLEY.

SPECIFICATION forming part of Letters Patent No. 462,363, dated November 3, 1891.

Application filed February 21, 1891. Serial No. 382,297. (Model.)

*To all whom it may concern:*

Be it known that I, JOHN MURRAY, a citizen of the United States, residing at Fort Wayne, in the county of Allen, in the State of Indiana, have invented certain new and useful Improvements in Wood Pulleys; and I do hereby declare that the following is a full, clear, and exact description of the invention, which will enable others skilled in the art to which it appertains to make and use the same, reference being had to the accompanying drawings, which form part of this specification.

My invention relates to improvements in wooden pulleys, particularly that class of wooden pulleys known as "split pulleys," with a hub and hub disks or plates divided into separate sections on the line of its axis.

The objects of my improvement are, first, to provide a wood pulley with a metallic bushing which is entire instead of in sections, constructed to fit any shaft, avoids all shrinkage, can be centered upon the shaft with a positive grip, and insures perfect adjustment and true running; second, to provide a split pulley with a metallic center in sections securely keyed together at the hub-base and so adjusted upon the shaft that the set-screws and Babbitt-metal bushing form one mass, which secures a perfect centering and true running by a positive grip. These objects are accomplished by the mechanism illustrated in the accompanying drawings, in which—

Figure 1 is a side view of my improved pulley in elevation as it appears when adjusted upon the shaft. Fig. 2 is a vertical section of my improved pulley on the line $x\,y$, seen in Fig. 1, and shows the arrangement of the disks or plates D and D' when my pulley is adjusted upon the shaft.

Similar letters refer to similar parts in both views.

In Fig. 1 the rim A, the web B, the hub C, and the disks or plates D and D' constitute the frame-work of my improvement.

E is a vertical section of the shaft upon which my pulley is centered by the set-screws $f\,f'\,f'$ and held with a positive grip by the metallic bushing or Babbitt-metal filling F, which is formed by filling in molten metal after the pulley is centered by the said set-screws. The bolts $d\,d$ and $d'\,d'$ pass through the web B and the disks or plates D and D' upon both sides of web B, thereby securing the respective sections of the hub C and the said disks or plates to the web in a well-known manner. The key-bolts L L pass through the web B and the overlapping sections of the disks or plates D and D', and when adjusted in a proper manner they secure the half-sections of my pulley firmly and rigidly when adjusted upon the shaft.

The overlapping edges of the disks or plates D and D' are seen at $n$ and $n$ and $a$ and $a$ is the line of the split transversely through the web B and the rim A.

$a'$ and $a'$ is the line of the split through the hub C.

The bolts $h\,h$ are threaded at both ends and inserted into transverse slots K and M in the web B, and are secured therein by the adjustment of the threaded nuts $g\,g$ in the rectangular slots $l\,l$ and of the threaded nuts $k\,k$ in the slots $m\,m$. The bolts $h\,h$, which, when thus adjusted, assist in binding the two sections of the pulley firmly together, are designed to be used only in large-size pulleys.

In Fig. 2 the hub C, constructed of iron or other proper material, is formed of four parts, as shown by the line of the split $a'\,a'$, two parts being upon either side of the web B, and each part being secured to or cast in one piece with its corresponding disk or plate D or D', which is also made of iron or other metal. These disks or plates have slots $i$ and $o$ for the reception of the sections $r$ and $s$, respectively, of the corresponding opposite disks or plates.

The hub C, with the disks or plates D and D', cast as above described or otherwise united, is secured to the web B by the bolts $d$ and $d'$.

The manner of adjusting, centering, and securing my pulley thus described upon the shaft E is as follows: The two sections of my pulley are adjusted upon the shaft at any desired point, with the bolts $h\,h$, Fig. 1, inserted in the slots K and M. The nuts $g\,g$ and $k\,k$ are then adjusted and tightened on bolts $h\,h$, thus drawing the two sections of my pulley firmly together. The projecting sections $r$ and $s$ of the disks or plates D and D' will thus be adjusted in the slots $i$ and $o$, respectively, Fig. 2. The hub C, having disks or plates D and D', is then rigidly keyed together in a proper manner by the key-bolts L L, Fig. 1, heretofore described. The pulley is then centered upon the shaft E by the set-screws $f$ and $f'$, Fig. 2, and the space F, Fig. 1, is then filled with molten Babbitt metal, which, when cooled, securely holds the said set-screws and make a tight split pulley, which can be centered on the shaft with the metallic bushing entire and secured by a positive grip, thereby avoiding all danger of shrinkage and insuring true running and perfect adjustment to any size shaft.

My improved pulley may be removed from the shaft in the following manner: Withdraw the set-screws far enough to clear the Babbitt metal, and then remove the key-bolts L L and the threaded nuts from the web-bolts $h$ and $h$. The two parts of my pulley may then be removed from the shaft, and the Babbitt-metal bushing, which will adhere to the shaft, may be chopped off or otherwise removed from the shaft in any suitable manner.

My improved pulley can also be used as a loose pulley with a solid or entire metallic bushing by painting the shaft at the place of adjustment, centering the pulley by the set-screws, then filling the space F, Fig. 1, with molten Babbitt metal, and when cooled withdrawing the said set-screws and removing the paint. The pulley can then at pleasure be reconverted into a tight pulley by replacing and tightening the said set-screws.

I am aware that prior to my invention split pulleys of various kinds with wood bushings have been in use, and Babbitt-metal bushings are also in common use; but no split pulley has ever been invented of which I am aware which can be centered on the shaft by set-screws, and having a Babbitt-metal bushing so constructed as to fit any size shaft with a positive grip, and can also be used either as a tight or loose pulley without removing the pulley from the shaft.

What I claim, therefore, as my invention, and desire to secure by Letters Patent, is—

1. In a split pulley, the combination of the web B, the bolts $h\,h$, the centering set-screws, the Babbitt-metal bushing or filling, the hub C, and the overlapping plates D and D', all substantially as described, and for the purposes hereinbefore set forth.

2. In a split pulley, the combination of the web B, having a rim A, with hub C, centering set-screws, and Babbitt-metal filling, all substantially as described.

Signed by me this 18th day of February, 1891.

JOHN MURRAY.

Witnesses:
SAML. L. MORRIS,
JOHN MORRIS, Jr.